(12) United States Patent
Georgis (10) Patent No.: US 8,019,908 B2
(45) Date of Patent: Sep. 13, 2011

(54) DATA REPLICATION SYSTEMS AND METHODS

(75) Inventor: Steven P. Georgis, Boulder, CO (US)

(73) Assignee: Tandberg Data Holdings S.A.R.L., Luxembourg (LU)

( * ) Notice: Subject to any disclaimer, the term of this patent is extended or adjusted under 35 U.S.C. 154(b) by 379 days.

(21) Appl. No.: 11/122,322

(22) Filed: May 3, 2005

(65) Prior Publication Data

US 2006/0129373 A1 Jun. 15, 2006

Related U.S. Application Data (60) Provisional application No. 60/586,086, filed on Jul. 6, 2004, provisional application No. 60/586,087, filed on Jul. 6, 2004, provisional application No. 60/586,085, filed on Jul. 6, 2004.

(51) Int. Cl.
  *G06F 3/00* (2006.01)
  *G06F 13/00* (2006.01)
(52) U.S. Cl. ............................. 710/20; 710/7; 710/31
(58) Field of Classification Search .............. 710/31, 710/301, 20, 7; 711/115
See application file for complete search history.

(56) References Cited

U.S. PATENT DOCUMENTS

| | | | |
|---|---|---|---|
| 5,075,805 A | 12/1991 | Peddle et al. | |
| 5,386,545 A * | 1/1995 | Gombos et al. ..................... | 1/1 |
| 6,381,662 B1 * | 4/2002 | Harari et al. ................... | 710/301 |
| 6,611,394 B1 | 8/2003 | Kato et al. | |
| 6,618,795 B2 | 9/2003 | Chan et al. | |
| 6,674,596 B1 | 1/2004 | Takayama | |
| 6,717,762 B1 | 4/2004 | Bauck et al. | |
| 6,717,769 B2 | 4/2004 | Staley et al. | |
| 6,813,698 B2 | 11/2004 | Gallo et al. | |
| 6,865,640 B2 | 3/2005 | Dimitri et al. | |
| 6,892,275 B2 | 5/2005 | Bolt et al. | |
| 6,957,291 B2 | 10/2005 | Moon et al. | |
| 7,634,588 B2 * | 12/2009 | Okada et al. .................... | 710/5 |
| 2002/0144044 A1 | 10/2002 | Moon et al. | |
| 2003/0149700 A1 | 8/2003 | Bolt | |
| 2004/0181388 A1 | 9/2004 | Yip et al. | |
| 2005/0033911 A1 | 2/2005 | Kitamura et al. | |
| 2005/0099969 A1 * | 5/2005 | Roberts et al. ............... | 370/316 |
| 2005/0188246 A1 | 8/2005 | Emberty et al. | |
| 2005/0193235 A1 | 9/2005 | Sandorfi et al. | |
| 2005/0268119 A9 | 12/2005 | Guha et al. | |
| 2006/0010275 A1 | 1/2006 | Moon et al. | |
| 2006/0010458 A1 | 1/2006 | Georgis | |
| 2006/0129711 A1 * | 6/2006 | Matsushige et al. ........... | 710/36 |

OTHER PUBLICATIONS

Universal Serial Bus—Wikipedia, the free encyclopedia, Jan. 18, 2006, http://web.archive.org/web/20060118131155/en.wikipedia.org/wiki/Universal_Serial_Bus.*
"What Is iVDR?," printout from website http://www.ivdr.org/iVDR/ivdr_e.html, 2 pages, printout date: May 27, 2004.

* cited by examiner

*Primary Examiner* — Alford Kindred
*Assistant Examiner* — Farley Abad
(74) *Attorney, Agent, or Firm* — Kilpatrick Townsend & Stockton LLP (57) ABSTRACT

Data replication systems and methods are disclosed. In one embodiment, the method comprises at a system controller of a disk device, receiving data at a system controller of a removable cartridge storage device, transferring the data to a first portable data cartridge and transferring the data to a second portable data cartridge. The first and second portable data cartridges are electrically coupled with the system controller and removably coupled with the removable cartridge storage device.

23 Claims, 8 Drawing Sheets

DATA REPLICATION SYSTEMS AND METHODS

CROSS-REFERENCE TO RELATED APPLICATIONS

This application claims the benefit of U.S. Provisional Application No. 60/586,086, entitled "Data Replication System for Removable Data Cartridges", filed Jul. 6, 2004, which is incorporated herein by reference.

This application is also related to U.S. patent application Ser. No. 11/121,760 entitled "Removable Cartridge Storage Devices and Methods", filed May 3, 2005, U.S. Provisional Application No. 60/586,087 entitled "Electronic Storage Cartridge", filed on Jul. 6, 2004 and U.S. Provisional Application No. 60/586,085, entitled "Removable Cartridge Disk Device and Methods", filed Jul. 6, 2004. The details of these applications are hereby incorporated by reference.

BACKGROUND OF THE INVENTION

The present invention generally relates to data storage devices. More specifically, the present invention relates to removable cartridge storage devices.

Computer backup has traditionally been performed using tape drive technologies. Tape drive technologies have been popular in the use of backup systems for a variety of reasons. One reason is that tape media has generally had the lowest cost per bit of storage. Additionally, tape devices use removable tape cartridges, which may be taken to an off-site location to provide for disaster recovery. A third reason tape devices are popular is because of the long-term archive characteristics of tape media.

Policies may be set by companies specifying requirements for computer system backup for data recover and disaster recovery. One preferred practice requires that multiple copies (typically two) of the data be recorded on magnetic tape or other suitable removable storage medium. One copy is kept on-site for quick access in the event that data must be restored. The other copy is sent off-site for disaster recovery purposes.

Figure 1:
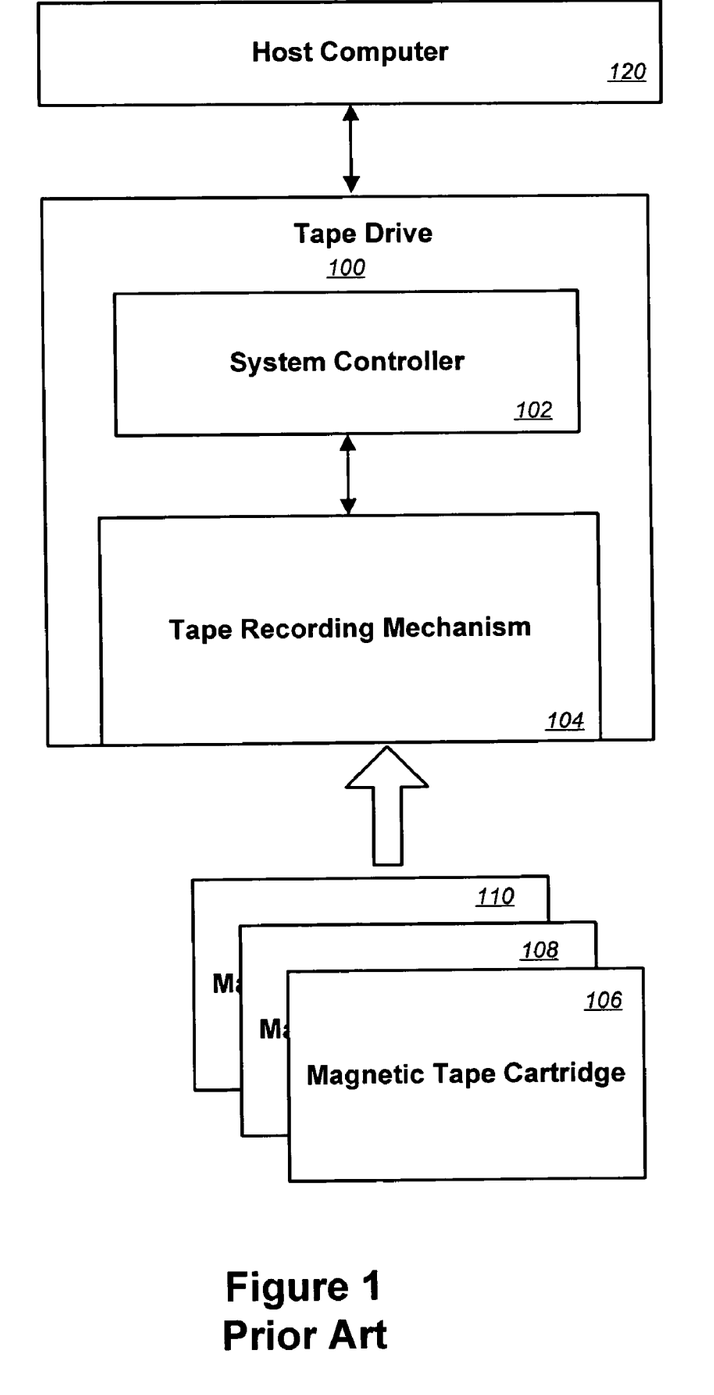
FIG. 1 illustrates a prior art tape drive.

System administrators may be faced with a difficult choice when implementing a backup policy that requires multiple copies of data. One solution is to create copies sequentially using a single tape drive. A prior art standalone tape drive that may be used in this type of solution is illustrated in FIG. 1. The tape drive 100 includes a system controller 102. The system controller 102 includes an interface (e.g., Small Computer Systems Interface (SCSI), Fiber Channel (FC), etc.) to a host computer 120 and a microprocessor which performs data formatting for the tape medium. The tape drive 100 also includes a tape recording mechanism 104 which mechanically controls the movement of magnetic tape past the magnetic recording/playback head(s) and magnetically encodes the formatted data on magnetic tape cartridges 106, 108, 110. Tape recording mechanism 104 is also used to read data from the magnetic tape cartridges 106, 108, 110. Although using a single tape drive 100 may minimize cost, the amount of time required for backup is multiplied by the number of copies made. Additionally, as the amount of data stored on the computer systems increases and/or the amount of time available to perform the backup operation (i.e., the backup window) decreases, the ability to perform sequential copies becomes very limited.

Figure 2:
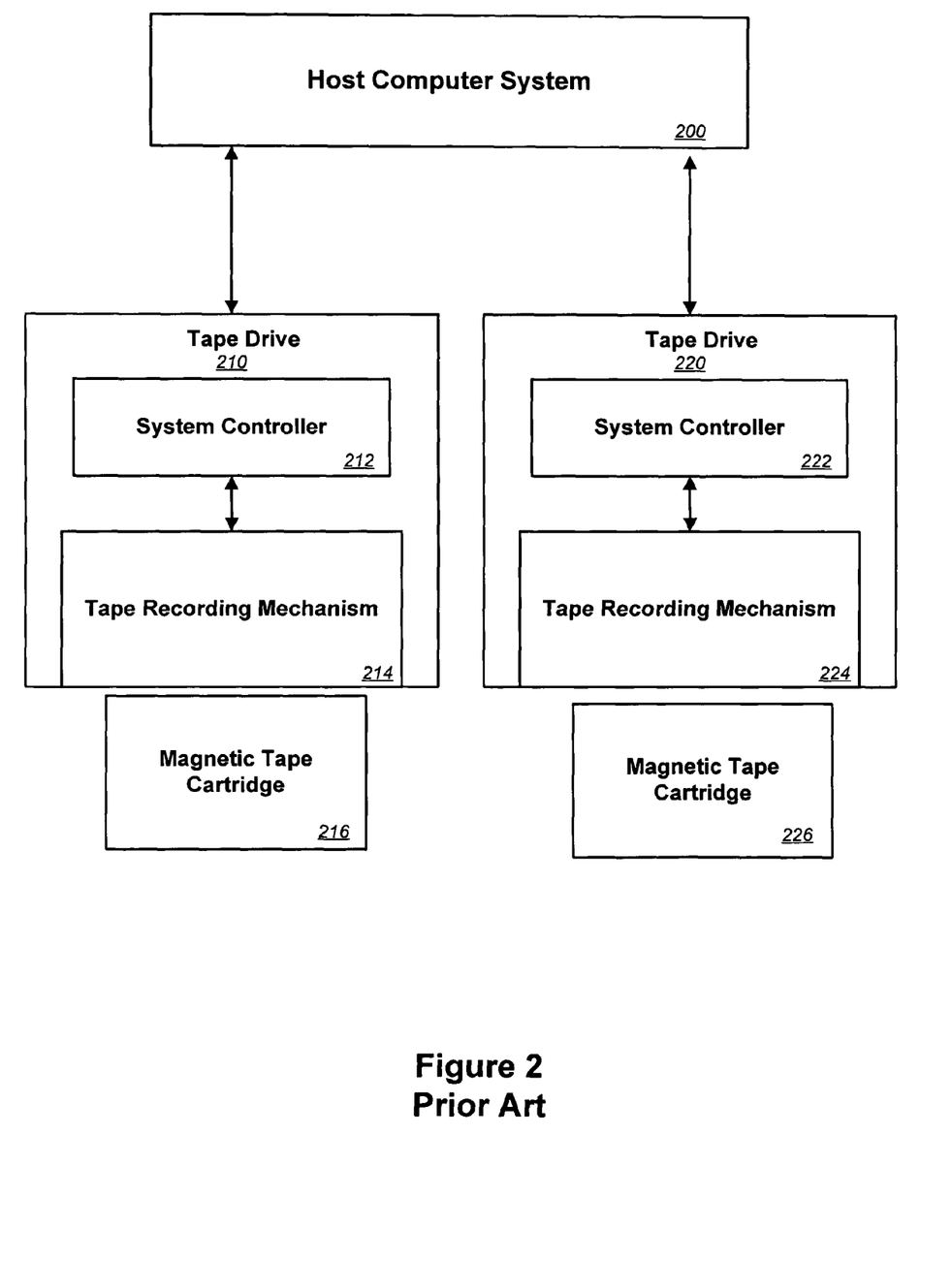
FIG. 2 illustrates a prior art multiple tape drive system.

FIG. 2 illustrates a second prior art solution that uses multiple tape drives 210, 220 coupled to a host computer system 200. Both tape drives include system controllers 212, 222. Additionally, each tape drive includes a tape recording mechanism 214, 224, which may be used to control the movement of magnetic tape and magnetically encode data on a magnetic tape cartridge 216, 226. Although the two tape drives 210, 220 may be operated in parallel to record the data, this system carries a higher system cost because of the duplication in tape drives 210, 220. Additionally, this system places a larger burden on the network and host computer system 200 as the data must be transmitted twice, once to each tape drive 210, 220.

BRIEF SUMMARY OF THE INVENTION

Data replication systems using portable data cartridges and methods are disclosed. In one embodiment, the method comprises receiving data at a system controller of a removable cartridge storage device. The data is transferred to a first portable data cartridge electrically coupled with the system controller and removably coupled with the removable cartridge storage device. The data is also transferred to a second portable data cartridge electrically coupled with the system controller and removably coupled with the removable cartridge storage device. In some aspects, the first and second portable data cartridges may each include an embedded hard disk drive (HDD), flash memory, or other electronic, electromagnetic, or electro-optical storage medium. If needed, the data may be restored from either the first or second portable data cartridge.

The method may, in some embodiments, further comprise electronically switching communications from the system controller to the second portable data cartridge. alternatively or additionally, the method may comprise performing one or more formatting options on the data before transferring the data to the first and/or second portable data cartridges. In still further aspects, at least a portion of the data may be transferred to the second portable data cartridge before completing the data transfer to the first portable data cartridge.

In some embodiments, the method may further comprise emulating, with the system controller, a sequential access device. In these embodiments, a tape device command (e.g., a SCSI Stream Command) may be received at the removable cartridge storage device and the system controller may process the tape device command. In some cases, the received data may be data associated with the tape device command.

In other embodiments, the method may further comprise removing the second portable data cartridge from the removable cartridge storage device. In some cases, the method may then further comprise removably coupling a third portable data cartridge to the removable cartridge storage device and receiving second data at the system controller. The second data is transferred to one of the first portable data cartridge or a fourth portable data cartridge. The second data is also transferred to the third portable data cartridge.

In other embodiments, the method may comprise receiving a copy command, at a system controller of a removable cartridge storage device, to copy data from a first portable data cartridge to a second portable data cartridge. By way of example, receiving the copy command may comprise receiving the copy command from a user interacting with a control panel of the removable cartridge storage device The portable data cartridges are electrically coupled with the system controller and removably coupled with the removable cartridge storage device. The system controller reads the data from the first portable data cartridge and writes the data to the second portable data cartridge. In some aspects, the method may also comprise removing the second portable data cartridge from the removable cartridge storage device.

In other embodiments, a data replication system is disclosed. The data replication system may comprise a first cartridge holder, a second cartridge holder, and a system controller. The cartridge holders each include an electrical connector configured to removably couple with a mating electrical connector of a portable data cartridge having an electronic interface. The system controller is configured to receive data, transfer the data to a first portable data cartridge removably coupled with the first cartridge holder and to transfer the data to a second portable data cartridge removably coupled with the second cartridge holder.

In some aspects, the system may further comprise a switch, coupled between the system controller and the first and second cartridge holders, to electronically switch communications between the system controller and each of the first and second cartridge holders. In other aspects, the system may further comprise a data formatting process to format the data before transferring the data, a data buffer to buffer the data, and/or a cartridge interface process to control data transfers.

In still further aspects, the data replication system may further comprise a control panel, configured to interact with a user of the removable cartridge storage device. The control panel may also be configured to receive a copy command to copy data from one portable data cartridge to one or more additional portable data cartridges removably coupled with the data replication system. In these embodiments, the system controller may further be configured to process the copy command.

A further understanding of the nature and advantages of the present invention may be realized by reference to the remaining portions of the specification and the drawings.

BRIEF DESCRIPTION OF THE DRAWINGS

Illustrative embodiments in accordance with the invention are illustrated in the drawings in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 3A:
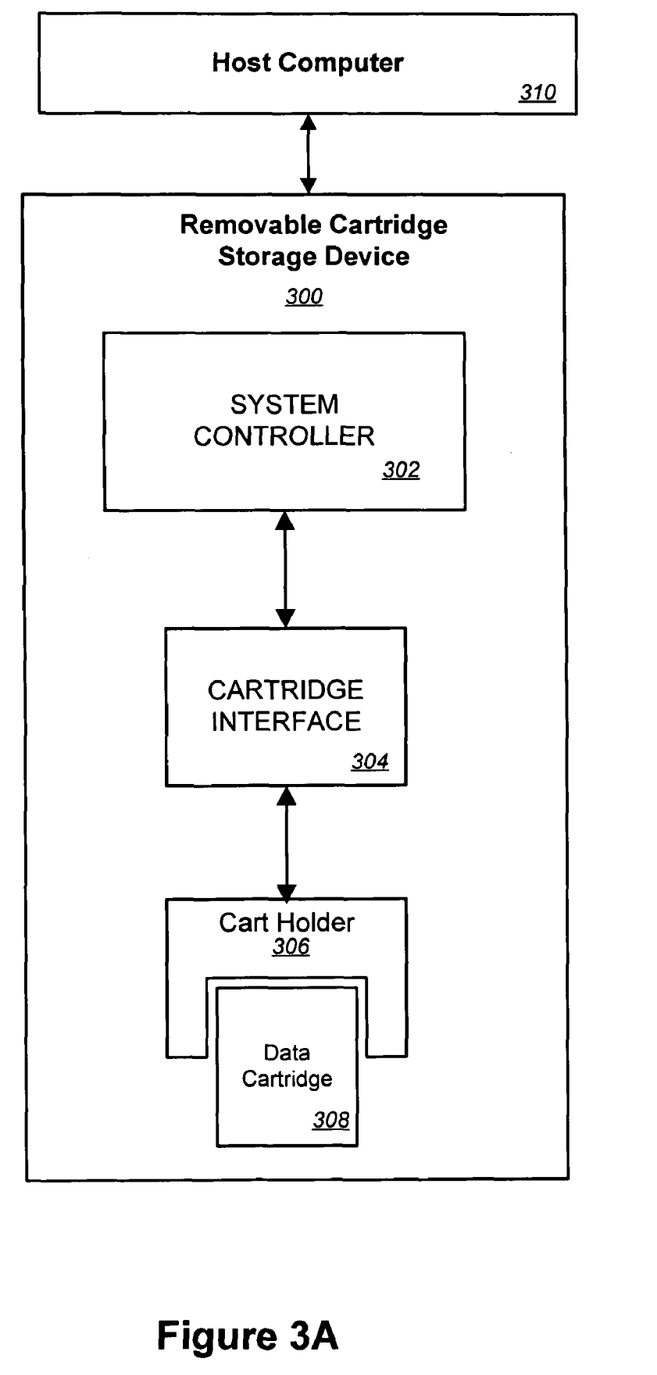
FIG. 3A is a block diagram of an exemplary embodiment of a removable cartridge storage device.

FIG. 3A illustrates an exemplary embodiment of a removable cartridge storage device 300. The removable cartridge storage device 300 may include a system controller 302, a cartridge interface 304, and a cartridge holder 306. A host computer system 310 may be communicatively coupled with removable cartridge storage device 300. As will be described further below, portable data cartridges 308 may be removably coupled with removable cartridge storage device 300.

System controller 302 may process data commands and other types of commands (or requests) transmitted to the removable cartridge storage device 300. In some aspects, the system controller 302 may include an interface 304 to host computer 310. Interface 304 may be used to receive device commands and data from host computer 310 and to transmit data and other communications from removable cartridge storage device 300 to the host computer 310. By way of example, the interface 304 to the host computer 310 may be a any version of Small Computer System Interface (SCSI), a Fiber Channel (FC) interface, an Ethernet interface, an Advanced Technology Attachment (ATA) interface, or any other type of interface that allows the removable cartridge storage device. 300 to communicate with a host computer 310. System controller 302 may also perform other functions to process data, such as data buffering, data compression, error correction coding (ECC) and data formatting for the data cartridge 308 used to store data. Other well-known functions of a system controller, such as error recovery or other formatting options commonly performed by sequential and/or random access devices, may also be performed by system controller 302.

In some embodiments, removable cartridge storage device 300 may emulate a tape device. In these aspects, system controller 302 may be configured to emulate a tape device and/or execute tape device commands (e.g., sequential tape device commands, such as any version of SCSI Stream Commands (SSC) or Advanced Technology Attachment Packet Interface (ATAPI commands). Hence, in some embodiments, data associated with the tape device commands may be written to and read from portable data cartridge 308 sequentially. System controller 302 may translate tape device commands received from a host computer 310 into the appropriate commands for the removable cartridge storage device 300. Some of the tape device commands may not result in any action by removable cartridge storage device 300 (other than possibly an acknowledgement or success communication result) if the tape device command does not have a corresponding command for portable cartridges with electrical interfaces (e.g., rewind). System controller may also emulate a tape device when it transmit results and other communications back to host computer 310. Thus, the removable cartridge storage device 300 may appear to software applications (e.g., backup applications) running on the host computer 310 as a tape device. In alternative embodiments, the removable cartridge storage device 300 may appear to the host computer 310 as another type of storage device, such as a random-access block device (e.g., hard disk drive, optical disk drive, flash memory) and/or may execute other types of commands, such as ATA Packet Interface commands.

System controller 302 may be communicatively coupled with cartridge interface 304. Cartridge interface 304 may comprise electronic circuits which may be used to provide the physical electronic signaling to a portable data cartridge 308 (removably coupled with cartridge holder 306) to read and write data and to issue commands to the portable data cartridge 308. In one embodiment, the cartridge interface 304 may include a single port serial ATA (Advanced Technology Attachment).

Cartridge interface 304 may be communicatively coupled to a cartridge holder 306, which may be configured to removably couple with a portable data cartridge 308. Although FIG. 3A illustrates a data cartridge 308 inserted into the cartridge holder 306, at times, a data cartridge will not be inserted into cartridge holder 306. Additional data cartridges may also be used with the removable cartridge storage device 300.

Removable cartridge storage device 300 may be designed so that a portable data cartridge 308 may be inserted by a user at any time, regardless of the power state or other state of host computer 310. Other aspects may allow a data cartridge 308 to be ejected at the request of the user (e.g., by means of an eject button) and/or by command from an application, such as a software application executing on host computer 310. System controller 302, or other component, may include functionality to prevent the cartridge 308 from being ejected while a data transfer operation is in process. Prior art storage devices, such as Hard Disk Drives (HDDs), require the user to install and remove the device when the host computer is powered-off or by invoking special installation programs in the host computer or its operating system software. Unlike these types of devices, removable cartridge storage device 300 may enable portable data cartridges 308 to be asynchronously inserted without any user action with the host computer 310 or its operating software and without disrupting the operation of the host computer 310, including its file system.

It should be appreciated that in alternative embodiments, the removable cartridge storage device 300 may include additional, fewer, or alternative components than shown in FIG. 3A. For example, removable cartridge storage device 300 may include more than one interface, which may be the same or different than the type of interface 304. Other variations are also contemplated.

Figure 3B:
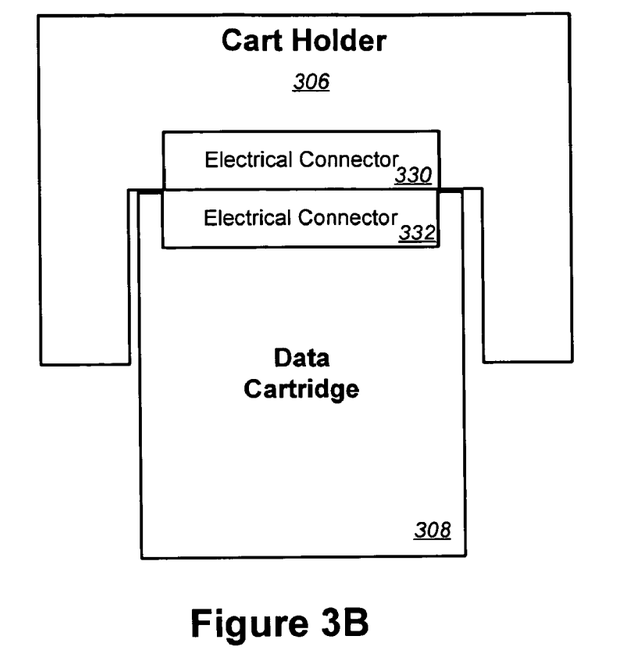
FIG. 3B illustrates an exemplary embodiment of the cartridge holder in FIG. 3A.

FIG. 3B illustrates an exemplary coupling between cartridge holder 306 and a portable data cartridge 308. Cartridge holder 306 may include an electrical connector 330. Data cartridge 308 may also includes an electrical connector 332 configured to mate with electrical connector 330. Thus, data cartridge 308 may be electrically coupled to the removable cartridge storage device 300 via cartridge holder 306 by mating its electrical connector 332 with the electrical connector 330 of the cartridge holder 306.

In other embodiments, cartridge holder 306 may removably couple and/or communicate with data cartridge 308 using different means. By way of example, cartridge holder 306 may use radio frequency, infra-red, or other types of wireless communications to communicate with data cartridge 308. Thus, it should be appreciated that data cartridge 308 and cartridge holder 306 may include alternative or additional communications to enable data cartridge 306 to communicate with removable cartridge storage device 300.

Figure 4:
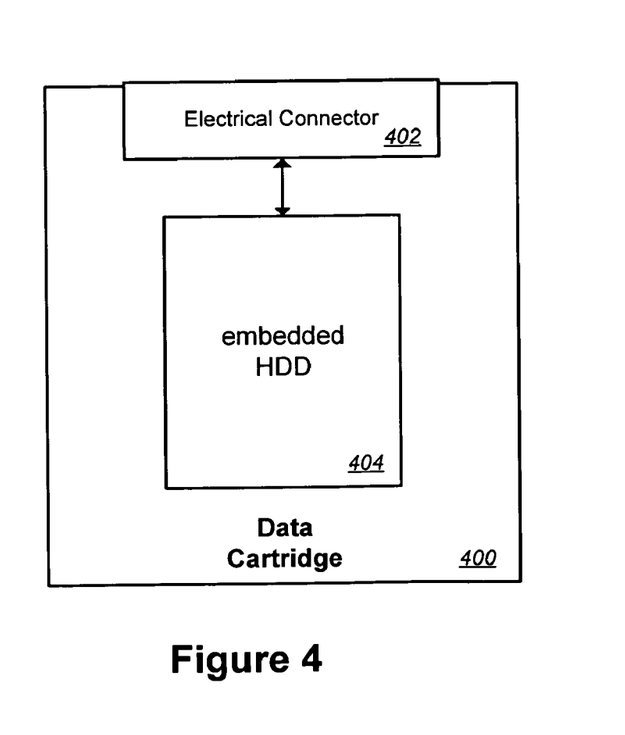
FIG. 4 illustrates an exemplary embodiment of a portable data cartridge.

FIG. 4 illustrates one exemplary embodiment of a portable data cartridge 400 which may be used in a removable cartridge storage device. The data cartridge 400 may include an electrical connector 402 configured to mate the data cartridge 400 to the removable cartridge storage device. When the data cartridge 400 is coupled with a removable cartridge storage device, the removable cartridge storage device may read data from the cartridge, write data to the cartridge, and issue commands to the cartridge. The data cartridge 400 may store the data in portable electronic format, so that the data persists after the data cartridge 400 is removed from a removable cartridge storage device. The data may also be stored in a format so that it is readable by storage devices other than the removable cartridge storage device that wrote the data to the data cartridge 400.

Data cartridge 400 may, in some aspects, include an embedded hard disk drive (HDD) 404. HDD 404 may include functionality similar to a standard HDD. For instance, data may be stored on HDD 404 by issuing a write command to the data cartridge 400 via electrical connector 402. Other known disk commands may also be issued to HDD 404 via the electrical connector interface 404.

In some embodiments, data cartridge 400 may have functional characteristics similar to a tape cartridge, such as an ergonomic form and low cost. In other embodiments, data cartridge 400 may not include an embedded HDD 404, but instead may include another type of data storage that has an electronic interface, such as optical or flash storage. Further details of features that may be included in data cartridge 400 may be found in previously incorporated provisional patent application No. 60/586,087, entitled "Electronic Storage Cartridge."

Figure 5:
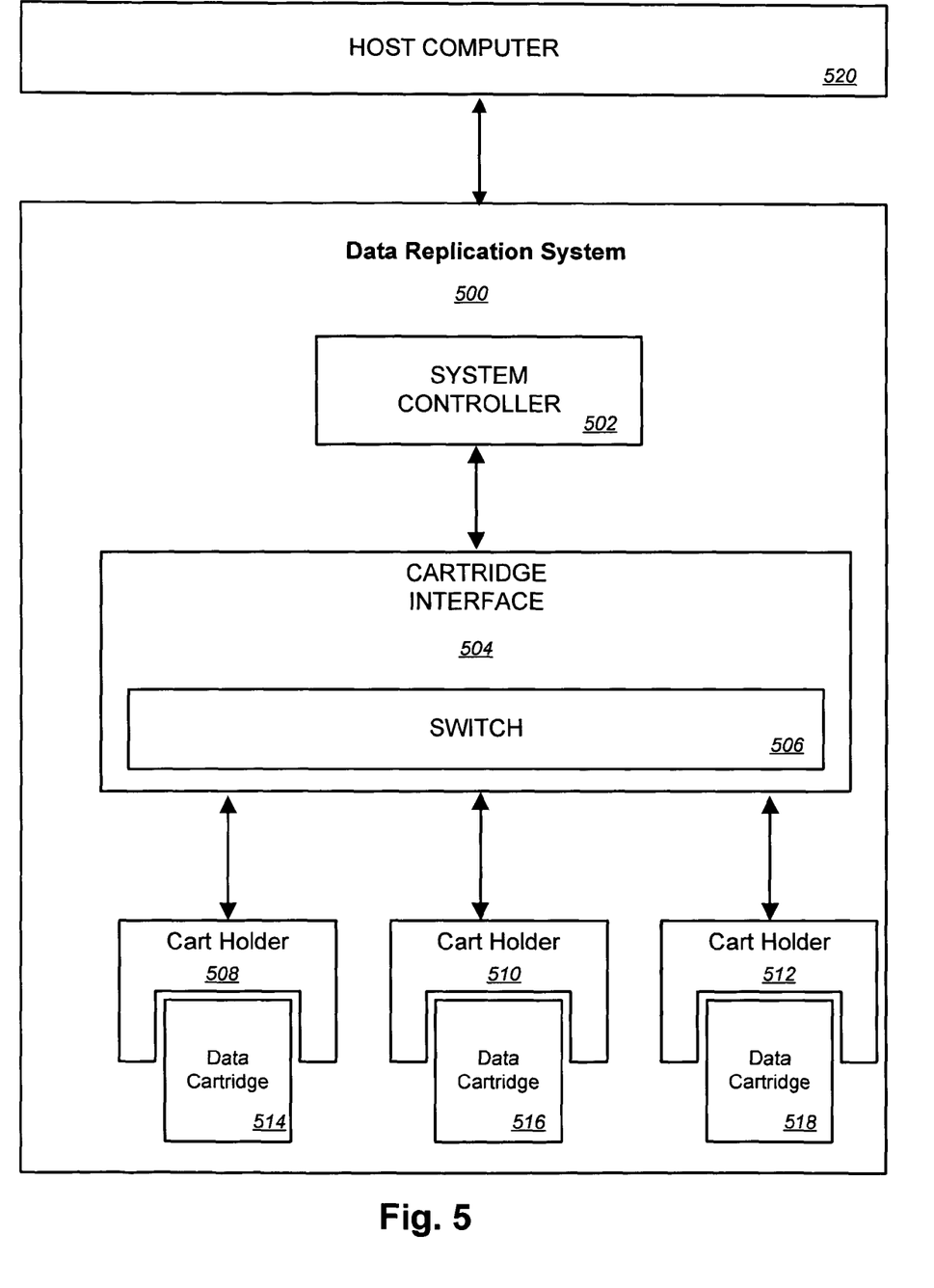
FIG. 5 illustrates an exemplary embodiment of a data replication system.

FIG. 5 illustrates a data replication system 500 that may be used to record two or more copies of data to portable data cartridges at approximately the same time. The system 500 includes a system controller 502 communicatively coupled to cartridge interface 504. System controller 502 may be configured to receive and execute commands from host computer 520. System controller 502 may also perform any of the other functionality described with reference to the system controller 302 of FIG. 3A. Additional details of the configuration and functionality that may be performed by system controller 302 are described below.

Cartridge interface 504 includes electronic circuitry which may be used to provide electronic signaling to multiple portable data cartridges 514, 516, 518 having electronic interfaces. Portable data cartridges 514, 516, 518 may be removably coupled with cartridge holders 508, 510, 512 using any of the mechanisms described elsewhere in this application (e.g., through mating electrical connectors). As previously described, the data cartridges 514, 516, 518 may include an embedded HDD or other type of storage that may be electrically coupled with data replication system 500. In alternate embodiments, the system 500 may include fewer or additional cartridge holders 508, 510, 512 to which a data cartridge 514, 516, 518 may be electrically coupled.

Cartridge interface 504 may also include a switch 506 or other type of electronic switching component, such as a multiplexer or other multi-port device, to electronically switch communication connections between system controller 502 and portable data cartridges 514, 516, 518 removably coupled with cartridge holders 508, 510, 512 by making, breaking, or routing electrical connections between system controller and each of the cartridge holders 508, 510, 512. In some embodiments, cartridge interface 504 may comprise a multi-port serial-ATA (Advanced Technology Attachment) or multi-port serial SCSI controller. In larger systems (e.g., in systems greater than 8 cartridges), the system controller 502 may include multiple electronic components and processes to simultaneously manage a subset of the data cartridges 514, 516, 518, each subset coupled to its own cartridge interface 504.

In some embodiments, data replication system 500 may emulate a random-access block device (e.g., a hard disk drive, optical disk drive, flash memory drive), a sequential-access device (tape device) or any other type of device used for data backup. In aspects in which the system controller emulates a sequential-access device, the system controller 502, or other component of data replication system 500 may be configured to receive and execute commands for sequential access devices (e.g., any version of SCSI Stream Commands, ATA Packet Interface commands). Data associated with sequential write commands may be sequentially written to portable data cartridges. Similarly, data associated with sequential read commands may be sequentially read from portable data cartridges.

It should be appreciated that the use of a single system controller 502 to communicate with multiple data cartridges 514, 516, 518 may provide capabilities not available in traditional tape device systems having multiple tape drives. As one example, the portable data cartridges may provide higher performance and reliability than tape media. As another example, the system controller 502 may be able to perform parallel operations for multiple portable data cartridges 514, 516, 518. For instance, system controller 502 may burst data to a data cartridge 514, 516, 518 and then electronically switch to a different cartridge while the first data cartridge processes the burst data. This process may be repeated for as many copies of the data that are to be recorded. Thus, the host computer may transfer the data only once to a single system controller 502 with a specification on the number of copies that are to be made. Alternately, the data replication system 500 may be configured with a default value specifying the number of replications to be made. The system controller 502 may then make the multiple copies of the data at essentially the same time. This may provide for faster backup time than a single tape drive 100 and less network load (and possibly cost) than a multiple tape drive system 200.

In some embodiments, the data replication system 500 may include at least eight cartridge holders for holding removable data cartridges. Seven of the cartridge holders may be used to hold cartridges for on-site daily backups and the eighth cartridge holder may be used to hold a cartridge for off-site disaster recovery. Thus, the data replication system 500 may be used to record a daily backup to one of the seven cartridges in the daily backup set (e.g., in a round-robin fashion on a weekly rotation) while the data replication system 500 may record a second copy of the current day's backup to the eighth cartridge. This second copy may then be removed off-site each day for disaster recovery while the other seven cartridges remain in the system for the daily backup rotation. Thus, data on the daily cartridges may be re-written the next time the cartridge comes up in the rotation. Alternately, the cartridges may be removed at the end of the week and new cartridges may be inserted for the daily backups.

A suitable housing structure may be used to hold multiple cartridge holders 508, 510, 512. The structure may be designed so that an operator may have access to the cartridge holders to add and remove cartridges 514, 516, 518. One exemplary housing structure will be described below in reference to FIG. 7. Alternately, a robotic mechanism may be employed to enter and remove cartridges from the housing structure.

Figure 6A:
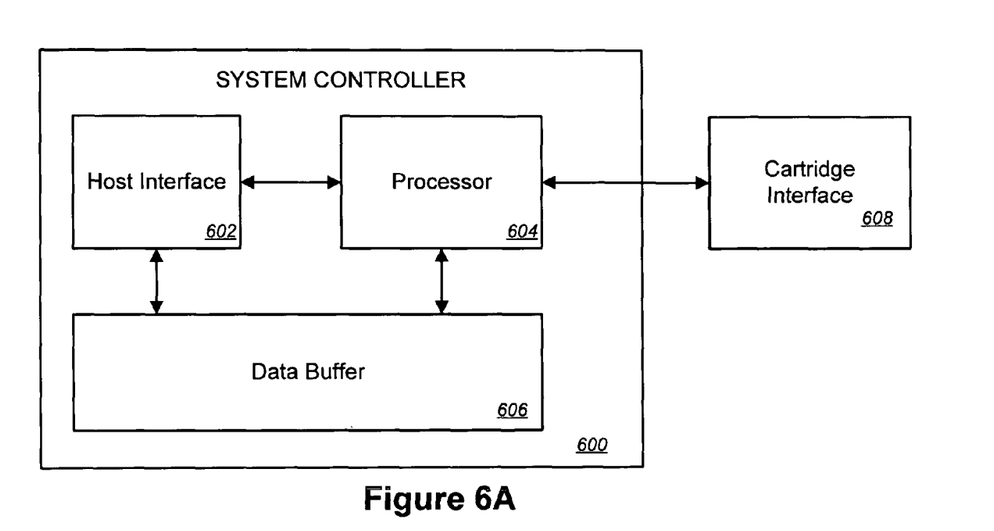
FIG. 6A is a block diagram of exemplary components of a system controller that may be included in a data replication system.

FIG. 6A illustrates an exemplary embodiment of components that may be included in a system controller of a data replication system. The system controller 600 may include a host interface 602, a processor 604, and a data buffer 606. Each of the components 602, 604, 606 may be communicatively coupled to the other components 602, 604, 606. The components 602, 604, 606 of system controller 600 may be implemented as any combination of electronic circuits, microprocessor(s), and embedded software which runs on the microprocessor and may operate the circuitry.

Host interface 602 may be any type of interface used to send and receive communications from a host computer. Merely by way of example, host interface 602 may be a SCSI, FC, or Ethernet interface. In some embodiments, host interface 602 may receive random-access block commands (disk commands). Alternatively or additionally, host interface 602 may receive sequential-access streaming commands (tape commands, such as any version of SCSI Stream Commands).

Data buffer 606 that may be used to store incoming and outgoing data. By way of example, data buffer 606 may be dynamic random access memory (DRAM). Other types of memory may also be used.

System controller 600 further includes a processor 604. Processor 604 may be used manage communications with host computer(s) coupled with the data replication system. Additionally, processor 604 may process data (e.g., format data, compress data, etc.) and data commands sent to the data replication system. Processor 604 may also manage data transfers to//from portable data cartridges coupled with the data replication system. Thus, processor 604 may be communicatively coupled with cartridge interface 608 component to direct the cartridge interface 604 to switch communication connections between the system controller 600 and each of the portable data cartridges removably and electrically coupled with the data replication system.

It should be appreciated that in alternate embodiments, the system controller 600 may include additional, fewer, or different components than those described with reference to FIG. 6A. For instance, in some embodiments, the system controller 600 may include additional host interfaces 602 to allow communications with more than one host computer. Other variations are also contemplated.

Figure 6B:
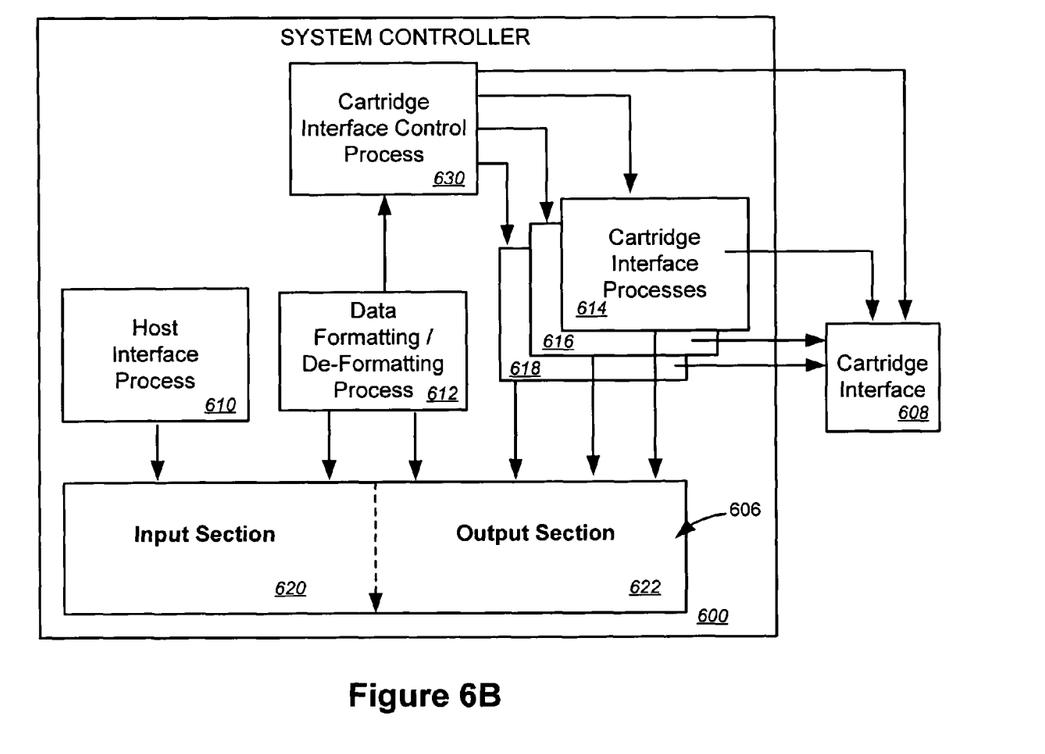
FIG. 6B is a block diagram of exemplary software operations of a system controller.

FIG. 6B illustrates an exemplary block diagram of embedded software processes that may be performed by system controller 600 when receiving data and host commands from a host computer. Host interface process 610 may be used to receive host computer commands and data transfers and put them in a logically partitioned input section 620 of data buffer 606. In some embodiment, the data buffer may be logically partitioned based on address space allocation to each logical function of system controller 600. In alternative embodiments, a different partitioning technique may be used to logically partition data buffer 606.

Data formatting process 612 may be used to remove data from the input section 620 of the data buffer 606 and perform formatting operations on the data. By way of example, data formatting process 612 may perform block packing, data compression, header creation, file marks, and/or other formatting options to prepare the data for recording on one or more portable data cartridges removably coupled with the data replication system.

After the data formatting process 612 has finished formatting the data 612, the data may be sent to the output section 622 of the data buffer 606. In some aspects, the data formatting process 612 may then notify a cartridge interface control process 630.

The cartridge interface control process 630 may be used to control initialization of a counter for the number of copies to be made and/or the selection of cartridge holder ports to receive the data. In some aspects, cartridge interface control process 630 may also manage a switching element in the cartridge interface 608 to direct the switching element to switch or route electrical connections to the appropriate data cartridge. Cartridge interface control process 630 may also manage signaling to cartridge interface processes 614, 616, 618 when the cartridge interface process is to transfer data.

Cartridge interface control process 630 may also manage multiple cartridge interface process 614, 616, 618. Each cartridge interface process 614, 616, 618 may be used to control the communication and data transfer operations with portable data cartridges removably coupled with the data replication system. In some embodiments, there may be a dedicated cartridge interface process for each of the cartridges to receive data. In alternative embodiments, multiple cartridges may share a cartridge interface process.

After the data formatting process 612 has sent data to the output section 622 of the data buffer 606, the appropriate cartridge interface process 614, 616, 618 may then remove the formatted data as needed to manage the communication and data transfer to a portable data cartridges. By way of example, in some embodiments, the cartridge interface processes 614, 616, 618, may rotate to rapidly send data to its respective data cartridge at burst speeds to a data buffer contained in the portable data cartridge. Although the cartridges may have high data transfer rates to the embedded storage (e.g., HDD), the burst speed from the cartridge interface 304 to the portable data cartridge (e.g., an embedded DRAM data component of the portable data cartridge) may be faster than the rate at which the portable data cartridge can transfer the data to its embedded storage. Thus, while the portable data cartridge is processing the data, the cartridge interface control process 630 may switch to select the next cartridge so the next cartridge interface process 614, 616, or 618 may send its data to its respective data cartridge.

In some embodiments, the cartridge interface control process 630 may allow each cartridge interface process 614, 616, 618 to complete its copying before switching to the next process. Alternately, a time-sliced round robin sequence may be used where the cartridge interface control process 630 allows each cartridge interface process 614, 616, 618 to run for a predetermined time before switching to the next process. As a third example, the cartridge interface control process 630 may use an interrupt driven process where each cartridge interface process 614, 616, 618 is queued to execute as interrupts that its associated data cartridge is ready to transfer more data or send back status. Other operations modes of the cartridge interface control process 630 are also contemplated. Once all cartridge interface processes 614, 616, 618 have completed their data transfers, the data block may be freed and the data buffer output section 622 may be made available for new data blocks.

Although the above description described the functionality performed by system controller 600 when data and commands are received from host computer, it should be appreciated that similar functionality in reverse may be performed by the processes 610-630 to send data to the host computer. For instance, host interface process 610 may retrieve data from data buffer 606 for transmittal to the host computer. As another example, the data formatting process 612 may be used to de-format data for transmittal to the host computer, as well as performing other types of data operations (e.g., uncompressing data) for transmittal to the host computer. Additionally, cartridge interface processes 614, 616, 618 or other processes may be used to receive data read from data cartridges. It should be appreciated that only one cartridge interface process may be used to restore data as the data may be restored from a single data cartridge.

In alternate embodiments, the system controller 600 may include fewer, different, or additional processes to manage data transfers between host computer and portable data cartridges removably coupled with the data replication system. Additionally, the functionality may be divided differently amongst the processes 610-614, 630 than that described and each process 610-614, 630 may use different means to perform its functionality than described above.

Figure 7:
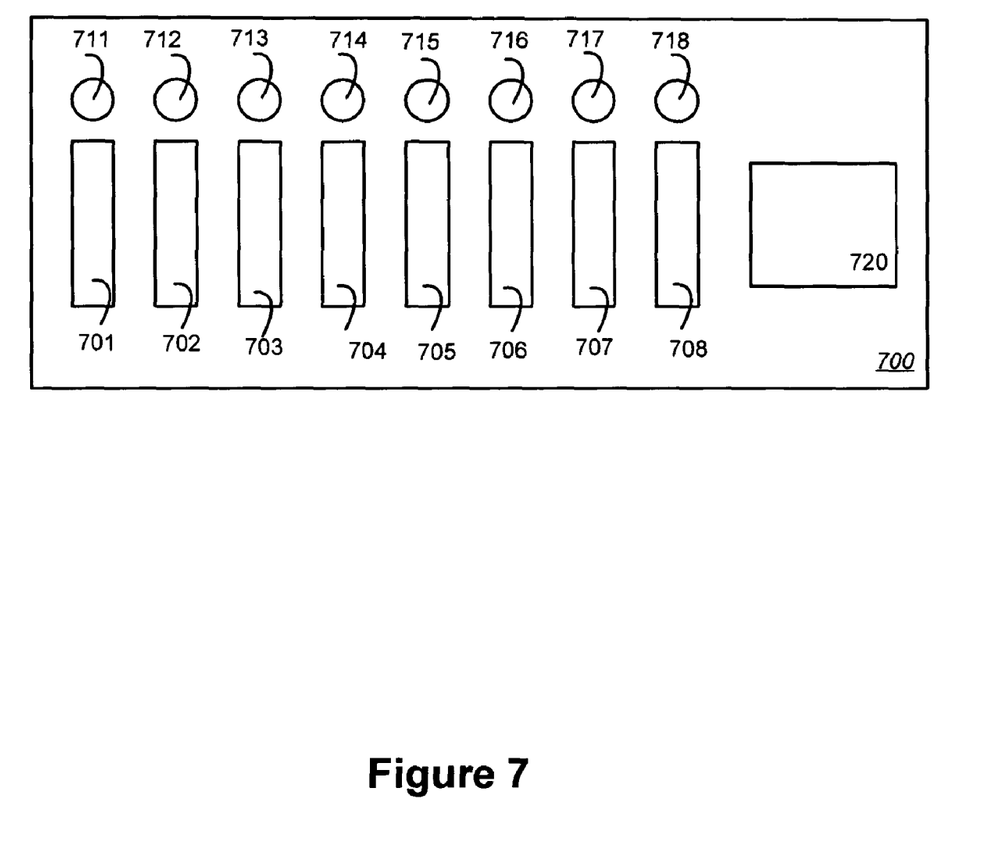
FIG. 7 illustrates an exemplary embodiment of a front view of a data replication system.

FIG. 7 illustrates a front view of an exemplary embodiment of a data replication system 700. The data replication system 700 includes a plurality of cartridge holders 701-708 for receiving removable cartridges. Each cartridge holder 701-708 may define an opening exterior to the data replication system 700 to receive a portable data cartridge. In some aspects, the cartridge holders 701-708 may each have an associated eject button 711-718 for ejecting the cartridge from the cartridge holder. Additionally, in some embodiments, status indicators (not shown), such as light emitting diode (LED) status indicators, may also be provided for each cartridge. The data replication system 700 may further include a control panel interface 720 to display autoloader device information, configure the system 700, power on/off the autoloader, and/or reset the system 700.

In the embodiment illustrated in FIG. 7, the location of the cartridge holders 701-708 on the front panel may make it easy for an operator to insert or remove cartridges. Thus, unlike prior art tape autoloaders with an single import/export mechanism feature, an operator of data replication system 700 may be able to insert or remove as many cartridges as desired without repeatedly performing a sequence of control panel keystrokes. Instead, the operator may merely insert or plug the data cartridges into the cartridge holders 701-708 or press the associated eject button 711-718 to eject a cartridge. Thus, the data replication system 700 may, in effect, provide multi-cartridge import-export functionality. In alternative embodiments, one or more of the cartridge holders 701-708 may not be included on the front panel and the data replication system 700 may provide another mechanism (such as a conventional import/export mechanism) to insert and remove cartridges into the device 700.

It should be appreciated that in alternate embodiments, the data replication system 700 may include additional or fewer cartridge holders 701-708. Additionally, in alternate embodiments, the system 700 may include fewer or additional components than shown in FIG. 7.

Figure 8:
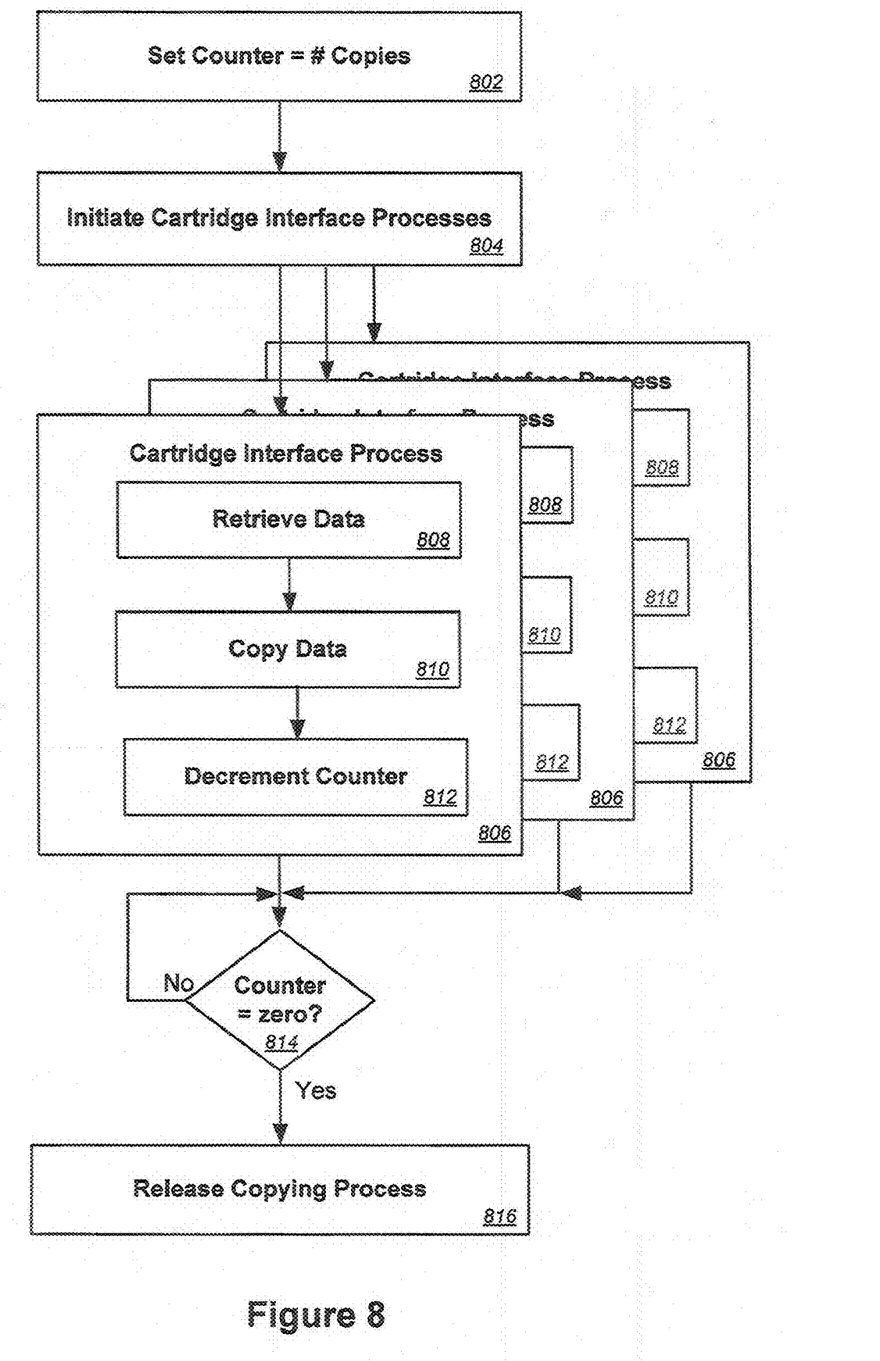
FIG. 8 is a flow diagram illustrating an exemplary method of copying data using a data replication system.

FIG. 8 illustrates an exemplary method that may be used by a data replication system to copy data. At block 802, a counter may is set equal to the number of copies that are to be made. Cartridge interface processes to copy the data to a removable cartridge are then initiated 804. By way of example, cartridge interface processes may be threads, sockets, or some other type of communication means for communicating with portable data cartridges removably coupled with the data replication system. In some aspects, a cartridge interface process may be initiated for each copy of the data.

Each cartridge interface process may then perform the process described in blocks 806. As previously described, a cartridge interface control process may be used to coordinate between the cartridge interface processes and switching of the switch. The cartridge interface process may retrieve 808 the data to be copied from a data buffer. After the cartridge interface process has been selected, the cartridge interface process may copy 810 the retrieved data to the data cartridge. The data may be burst to the data cartridge and processed by the data cartridge while the next cartridge interface process 806 copies 810 data to its respective data cartridge. In these aspects, the cartridge interface processes 806 may repeat the retrieving 808 and copying 810.

After the data has been copied, the cartridge interface process may decrement 812 the counter, indicating that the copy has been completed. A periodic check may be performed (e.g., by a cartridge interface control process) to determine 814 if the count is equal to zero. After the counter has been decremented to zero, indicating that all cartridge interface processes 806 have completed copying 810 the data, the copying process is released 816. Notification may be sent back to the host computer that the copying has completed.

In alternate embodiments, a data replication system may perform copies differently than described above. For instances, a counter for the number of copies may not be used.

Instead another mechanism to keep track of whether a cartridge interface process has completed its copying may be used. By way of example, a Boolean flag may be set by each cartridge interface process after the copying has been completed. Alternate mechanisms may also be used. As another example, the method may not include initiating cartridge interface processes. The processes may instead be hard coded or initiated at the start up of data replication system. Additional modifications are also contemplated.

In some aspects, the data replication system may allow a user to issue copy commands from a control panel of the data replication system. This may allow the user to perform an off-line copy of data without the use of a host computer. Data from a pre-recorded portable data cartridge may be copied to one or more additional data cartridges without the need for any data transfers between a host computer and the data replication system. In other aspects, the data replication system may be configured to perform data copies from prerecorded data cartridges to additional data cartridge(s) at predetermined times or other predetermined events. In still further aspects, a host computer may transmit a copy command to the data replication system (e.g., SCSI copy) to copy the data from one prerecorded cartridge to additional cartridge(s). Unlike prior art systems, the data replication system may be able to copy data without de-formatting and re-formatting the data and without transferring the data to a host computer. Instead, a cartridge interface process may read the data from the pre-recorded cartridge and place the formatted data into an output section of a data buffer component included in the system controller. The system controller may then use a process similar to that described above with reference to FIG. 7 or any other suitable copy process to transfer the data to the additional cartridge(s).

In the foregoing description, for the purposes of illustration, methods were described in a particular order. It should be appreciated that in alternative embodiments, the methods may be performed in a different order than that described. Additionally, the methods may include additional, different, or fewer blocks than described. It should also be appreciated that the methods may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
   receiving data at a system controller of a removable cartridge storage device;
   initiating first and second cartridge interface processes, wherein:
      the first cartridge interface process is communicatively coupled to a first portable data cartridge,
      the second cartridge interface process is communicatively coupled to a second portable data cartridge, and
      each of the first and second portable data cartridges is removably coupled with the removable cartridge storage device;
   transferring, with the first cartridge interface process, the data to the first portable data cartridge; switching from transferring the data to the first portable data cartridge to transferring, with the second cartridge interface process, the data to the second portable data cartridge; and
   receiving the data at the first portable data cartridge from the first cartridge interface process and processing the data for storage at the first portable data cartridge;
   receiving the data at the second portable data cartridge from the second cartridge interface process and processing the data for storage at the second portable data cartridge wherein:
      the system controller switches from transferring the data to the first portable data cartridge to transferring the data to the second portable data cartridge prior to the data being completely processed at the first portable data cartridge, and
      the first portable data cartridge is processing the received data simultaneously while the second portable data cartridge is processing the received data;
   receiving, at the removable cartridge storage device, commands and the data; and
   processing, with the system controller, the commands; wherein:
      the removable cartridge storage device comprises a housing at least partially containing at least the system controller, and first and second cartridge holders,
      the housing is configured to receive the first and second portable data cartridges; and
      upon receiving the data at the first and second portable data cartridges, each of the first and second portable data cartridges can be removed independently from the removable cartridge storage device and later used independently to retrieve the data.

2. The method of claim 1, further comprising, before transferring the data to the first portable data cartridge, performing one or more formatting options on the data; and wherein transferring the data to the first portable data cartridge comprises transferring the formatted data.

3. The method of claim 1, wherein transferring the data to the second portable data cartridge comprises transferring at least a portion of the data to the second portable data cartridge before completing the transferring the data to the first portable data cartridge.

4. The method of claim 1, further comprising emulating, with the system controller, a sequential access device.

5. The method of claim 4, further comprising:
   receiving, at the removable cartridge storage device, a tape device command; and
   processing, with the system controller, the tape device command.

6. The method of claim 5, wherein the tape device command comprises a SCSI Stream Command.

7. The method of claim 5, wherein receiving the data comprises receiving data associated with the tape device command.

8. The method of claim 5, wherein the tape device command comprises an ATAPI (Advanced Technology Attachment Packet Interface) command.

9. The method of claim 1, further comprising removing the second portable data cartridge from the removable cartridge storage device.

10. The method of claim 9, further comprising:
removably coupling a third portable data cartridge to the removable cartridge storage device;
receiving second data at the system controller;
transferring, with the system controller, the second data to one of the first portable data cartridge or a fourth portable data cartridge electrically coupled with the system controller and removably coupled with the removable cartridge storage device; and
transferring, with the system controller, the second data to the third portable data cartridge.

11. The method of claim 1, further comprising restoring the data from one of the first portable data cartridge and the second portable data cartridge.

12. The method of claim 1, wherein the first portable data cartridge includes an embedded hard disk drive (HDD), and wherein transferring the data to the first portable data cartridge comprises transferring the data to the embedded hard disk drive (HDD).

13. The method of claim 1, wherein the first portable data cartridge includes a flash memory, and wherein transferring the data to the first portable data cartridge comprises transferring the data to the flash memory.

14. The method of claim 1, further comprising emulating, with the system controller, a random-access block device.

15. The method of claim 14, further comprising:
receiving, at the removable cartridge storage device, a random-access block command; and
processing, with the system controller, the random-access block command.

16. The method of claim 15, wherein the random-access block command comprises an ATAPI (Advanced Technology Attachment Packet Interface) command.

17. The method of claim 15, wherein receiving the data comprises receiving data associated with the random-access block command.

18. The method of claim 1, further comprising:
transferring, with the system controller, the data to a third portable data cartridge electrically coupled with the system controller and removably coupled with the removable cartridge storage device; and
electronically switching, using a switch, the system controller from transferring the data to the second portable data cartridge to transferring the data to the third portable data cartridge.

19. A data replication system comprising:
a first cartridge holder and a second cartridge holder, the first and second cartridge holders each including an electrical connector configured to removably couple with a mating electrical connector of a portable data cartridge having an electronic interface;
a system controller configured to receive data from a host computer system and, in response to receiving the data, to initiate a first cartridge interface process to transfer the data to a first portable data cartridge removably coupled with the first cartridge holder and to initiate a second cartridge interface process to transfer the data to a second portable data cartridge removably coupled with the second cartridge holder;
a multiport multiplexer, coupled between the system controller and the first and second cartridge holders, to electronically alternatively couple the first cartridge interface process from transferring the data to the first cartridge holder to the second cartridge interface process transferring the data to the second cartridge holder, wherein:
the first data cartridge processes the data for storage at the first portable data cartridge,
the second data cartridge processes the data for storage at the second portable data cartridge
the multiport multiplexer switches from coupling the first cartridge interface process from transferring the data to coupling the second cartridge interface process transferring the data prior to the data being completely processed by the first portable data cartridge, and
the first portable data cartridge is processing the data simultaneously while the second portable data cartridge is processing the data; and
a housing at least partially containing at least the system controller, the multiport multipexer and the first and second cartridge holders,
wherein, upon transferring the data to the first and second portable data cartridges, each of the first and second portable data cartridges can be removed independently from the first and second cartridge holders and later used independently to retrieve the data.

20. The data replication system of claim 19, wherein the data replication system further comprises:
a control panel, configured to interact with a user interface, and to receive a copy command to copy data from one portable data cartridge removably coupled with the data replication system to one or more additional portable data cartridges removably coupled with the data replication system; and
wherein the system controller is further configured to process the copy command.

21. The data replication system of claim 19, wherein the system controller includes a data formatting process to format the data before transferring the data.

22. The data replication system of claim 19, wherein the system controller includes a data buffer to buffer the data.

23. The data replication system of claim 19, wherein the system controller includes a cartridge interface control process to control data transfers.

* * * * *